United States Patent [19]
Sekiya et al.

[11] Patent Number: 5,155,478
[45] Date of Patent: Oct. 13, 1992

[54] METHOD AND APPARATUS FOR CONVERTING GRAY SCALE

[75] Inventors: Kazuo Sekiya, Tokyo; Yuichi Shiraishi, Yamato, both of Japan

[73] Assignee: International Business Machines Corporation, Armonk, N.Y.

[21] Appl. No.: 411,089

[22] Filed: Sep. 22, 1989

[30] Foreign Application Priority Data

Apr. 22, 1988 [JP] Japan ................. 63-236290

[51] Int. Cl.⁵ ................. G09G 5/10; G06F 3/14
[52] U.S. Cl. ................. 340/793; 340/704; 340/703; 395/132
[58] Field of Search ............. 340/703, 701, 704, 793, 340/747; 395/132, 131

[56] References Cited

U.S. PATENT DOCUMENTS

| | | | |
|---|---|---|---|
| 4,755,954 | 7/1988 | Netter | 395/132 |
| 4,763,283 | 8/1988 | Coutrot | 395/131 X |
| 4,977,398 | 12/1990 | Pleva et al. | 340/793 |
| 5,003,299 | 3/1991 | Batson et al. | 340/703 |
| 5,059,962 | 10/1991 | Sekiya et al. | 340/793 |

FOREIGN PATENT DOCUMENTS

| | | |
|---|---|---|
| 0163903 | 12/1985 | European Pat. Off. . |
| 0310021 | 4/1989 | European Pat. Off. . |
| 2514531 | 4/1983 | France . |

Primary Examiner—Gary V. Harkcom
Assistant Examiner—Raymond J. Bayerl
Attorney, Agent, or Firm—Thomas P. Dowd

[57] ABSTRACT

A system for converting selected M gray levels in a K-gray scale to M identifiable levels in an N-gray scale, where $K > N \geq M$. A first table is created in which the respective M gray levels of the K-gray scale are mapped to different levels in the N-gray scale, which levels have the relative order and magnitude of their brightnesses in the K-gray scale, and using this first table, a second table is created in which the M gray levels in the N-gray scale are mapped to their corresponding M gray levels in the K-gray scale on a one-to-one basis according to the first table. Using the second table, any M gray levels in a K-gray scale can easily be converted to ones in an N-gray scale on a one-to-one basis with the relative order and magnitude of the brightnesses of those M gray levels being maintained.

8 Claims, 5 Drawing Sheets

INITIAL STAGE

REGISTER M LEVELS OF GRAYSCALE IN Tin[j]
WHERE j = [1, M]
 VALUES OF Tin[j] = [0, K-1]

PREPARE Tuse[i] AND PROVIDE "BLANK" IN ALL POSITIONS;
WHERE i IS CALLED "INDEX".
 i = [0, N-1]

PREPARE Tout[j];
WHERE Tout[j] CORRESPONDS TO Tin[j]
 j = [1, M]
 VALUES OF Tout[j] = [0, N-1]

FIG. 3a INITIAL STAGE
FIG. 3b FIRST STAGE (PROCESSING OF Vin: 61,21,22,23)
FIG. 3c FIRST STAGE (PROCESSING OF Vin: 63,20,43,46,62,42)
FIG. 3d FIRST STAGE (PROCESSING OF Vin: 60)
FIG. 3e FIRST STAGE (PROCESSING OF Vin: 0,2,1 AND COMPLETION OF FIRST STAGE)

METHOD AND APPARATUS FOR CONVERTING GRAY SCALE

BACKGROUND OF THE INVENTION

1. Field of the Invention

This invention involves a method and an apparatus for converting any M gray levels in a K-gray scale (halftone) image to M gray levels in an N-gray scale image, where $K > N \geq M$.

More particularly, the invention is directed to a method and an apparatus whereby image display output data from a personal computer, or the like, adapted to be displayed on one device, such as a CRT capable of displaying an image with K (e.g., 64)-gray scale levels, may also be displayed on another device, such as a plasma display capable of displaying an N (e.g., 16)-gray scale level image, in such manner that M (e.g., 14) gray levels in the K-gray scale level image are selected and converted to the N-gray scale level image so as to be mutually identifiable.

2. Prior Art

It is known that a dot matrix image having a multi-level gray scale may be displayed in a halftone representation using a dithering technique in order to convert it for display with another multi-level gray scale. However, with this technique, one-dot gray scale is converted to a multi-dot halftone and it cannot be applied to a one-dot to one-dot conversion.

Some personal computers can display a multi-level gray scale representation on a CRT, but they are not adaptable to convert that gray scale representation to another type of multi-level gray scale representation. Also, since the output from a personal computer to a printer is usually a two-level gray scale output, white and black, a gray scale conversion capability from one multi-level gray scale to some other multi-level gray scale is not provided.

At present there are a number of different display devices with various gray scale capabilities. For instance, an output device such as a CRT may display an image with, for example, a 64-gray scale representation while another display device, such as a conventional plasma display panel (PDP), can only display an image in, for example, a 16-gray scale. Consequently, it is necessary to convert display data outputted from the CRT controller for a 64-gray scale display to adapt it for display in 16-gray scale; or, in other words, if M ($M \leq 16$) gray levels in the 64 gray scale outputted from the CRT controller are converted to ones in a 16-gray scale representation, they can be displayed on the PDP. However, if the 64-gray scale representation is converted to a 16-gray scale representation on a proportional distribution basis, that is, for example, if the conversion to the 16-gray scale representation is carried out by extracting the upper y (e.g., 4) bits of the 64-gray scale x (e.g., 6) bit representation (hereinafter such a conversion is referred to as a "natural conversion"), degeneration of the gray levels can occur wherein some gray levels that are different from each other in the 64-gray scale representation are represented as the same gray level in the 16-gray scale representation. Such degeneration of gray levels presents a problem because gray levels which were originally identifiable become unidentifiable and the image represented may appear quite different on different displays.

It is thus desirable, and the object of the present invention, to solve this problem by converting first gray level signals to second gray level signals in such manner that, when each of M gray levels represented in a K-gray scale image is converted to a level represented in an N-gray scale image, the conversion is made without causing the degeneration of the gray levels and in accordance with the relative sequence and magnitude of their brightnesses.

SUMMARY OF THE INVENTION

In order to achieve the desired object with the invention, a first table is created in which the respective M gray levels of the K-gray scale are mapped to different levels in the N-gray scale, which levels have the relative order and magnitude of their brightnesses in the K-gray scale. Further, a second table is created in which the M gray levels in the N-gray scale are mapped to their corresponding M gray levels in the K-gray scale on a one-to-one basis according to the first table, whereby each of the M gray levels in a K-gray scale representation can be converted to an N-gray scale representation using the second table.

The first table is a processing table for making the second table, and in this regard, M gray levels in the K-gray scale are mapped into the N-gray scale having the relative order and magnitude of their brightnesses, so that a conversion table for solving the above problem is obtained by mapping the contents of the first table into the second table in a manner corresponding to the M gray levels in the K-gray scale.

If the condition $K > N \geq M$ is satisfied, any M gray levels in a K-gray scale can easily be converted to ones in an N-gray scale on a one-to-one basis, using the conversion table, and in addition a gray scale conversion is obtained in which the relative order and magnitude of the brightnesses of those M gray levels are maintained.

BRIEF DESCRIPTION OF THE DRAWINGS

FIGS. 3a–3e are schematic representations showing the operational stages of the processing table in the gray scale converter of FIG. 1.

DETAILED DESCRIPTION OF THE PREFERRED EMBODIMENT

Figure 1:
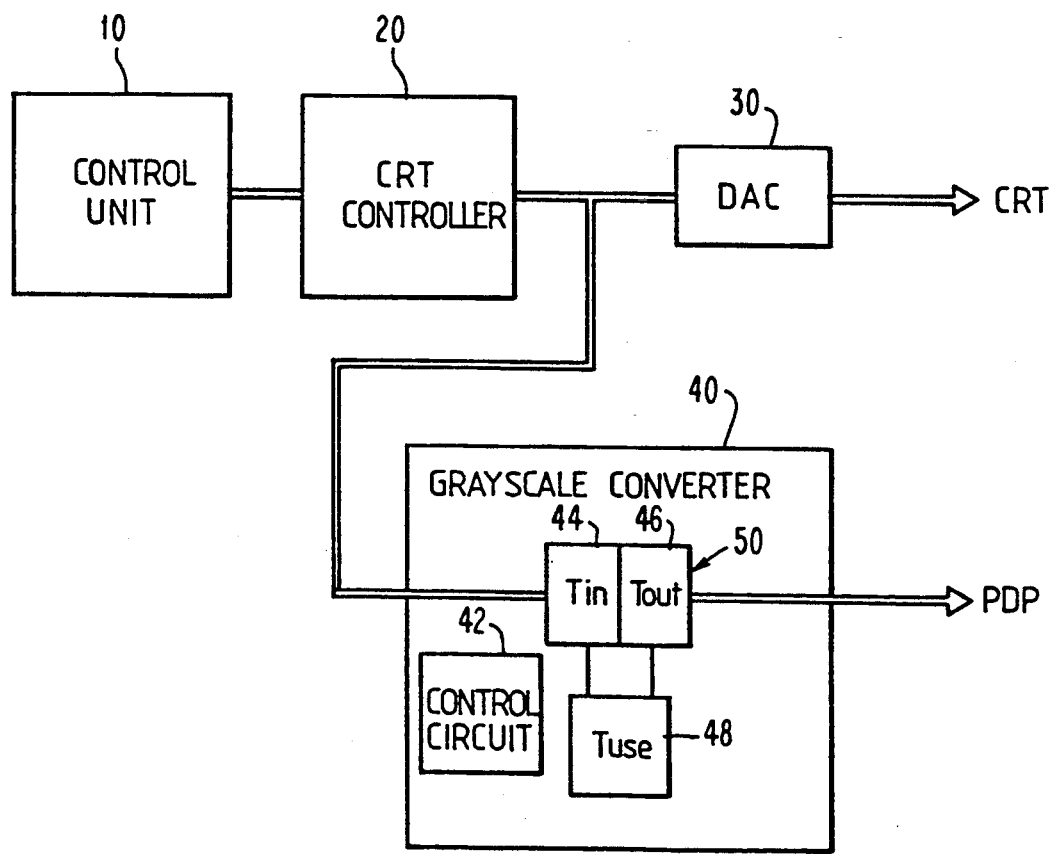
FIG. 1 is a block diagram illustrating an arrangement of components, for processing a display output of a personal computer, incorporating a gray scale converter according to the present invention.

FIG. 1 shows an example of an application of a gray scale conversion apparatus in accordance with the present invention. Data outputted from the control unit 10 of a personal computer, or the like, is converted by a CRT controller 20 for display on a CRT (not shown) which is capable of displaying 640×400 dots. This display data specifies gray levels in 64-gray scale with x (e.g.,6) bits representing each of 640×400 dots. The data is converted to analog data by a digital-to-analog converter (DAC) 30 and outputted to the CRT, on which it is displayed in the 64-gray scale.

This invention enables the display data output by the controller 20 to be displayed on another output device, for instance, on a plasma display panel (PDP), as well as on the CRT. As previously noted, at present, a conventional PDP can only display each dot in a 16-gray scale, so that, unlike the CRT, it cannot directly display the data outputted from the CRT controller 20 in a 64-gray scale. Consequently, it is necessary to convert the output data to adapt it for display in 16-gray scale. Although the CRT can display in the 64-gray scale, the CRT controller 20 can use only 16 gray levels at most of the 64-gray scale. Therefore, if M (M≦16) gray levels in the 64 gray scale outputted from the CRT controller 20 are converted to ones in a 16-gray scale representation, they can be displayed on the PDP. However, if the 64-gray scale representation is converted to a 16-gray scale representation on a proportional distribution basis, that is, for example, if the conversion to the 16-gray scale representation is carried out by extracting the upper 4 bits of the 64-gray scale representation 6 bits ("natural conversion"), degeneration of the gray levels can occur wherein some gray levels that are different from each other in the 64-gray scale representation are represented as the same gray level in the 16-gray scale representation. Clearly, such degeneration of gray levels is undesirable because gray levels which were originally identifiable become unidentifiable in the converted image.

This invention overcomes the above drawback by carrying out a gray scale conversion satisfying the following three conditions:

(1) The M gray levels in the K-gray scale, when converted to levels in the N-gray scale, must correspond to each other in the N-gray scale on a one-to-one basis, that is, the original M gray levels must be identifiable also in the N-gray scale;

(2) The M gray levels in the K-gray scale, when converted to levels in the N-gray scale, must maintain the relationship of the relative magnitudes of their brightnesses when in the N-gray scale; and (3) The relative brightness of dots in the K-gray scale must be also kept in the N-gray scale; however, if this is in conflict with the conditions in (1) and (2), an optimum gray level in the N-gray scale is to be selected.

Figures 2, 4A:
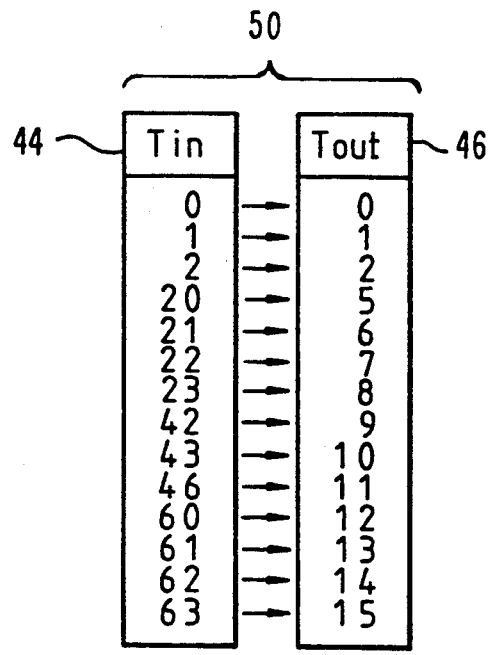
FIG. 2 is a schematic representation of the conversion table in the gray scale converter of FIG. 1.
FIGS. 4a–4c are flow charts illustrating the algorithm used in creating the conversion table of FIG. 2.

As seen in FIG. 1 this conversion is implemented by a gray scale conversion apparatus 40, in which the invention is incorporated, that receives the output of the CRT controller 20 and includes a control circuit 42 for creating a conversion table 50 (shown in detail in FIG. 2). The conversion table 50 comprises a table Tin 44, for representing any selected M gray levels in the K-gray scale, and a table Tout 46, for representing gray levels in the N-gray scale corresponding to those M gray levels, and, as will be apparent from the following description, any of the M gray levels in the K-gray scale can be converted to ones in the N-gray scale by using these tables.

Figure 4B:
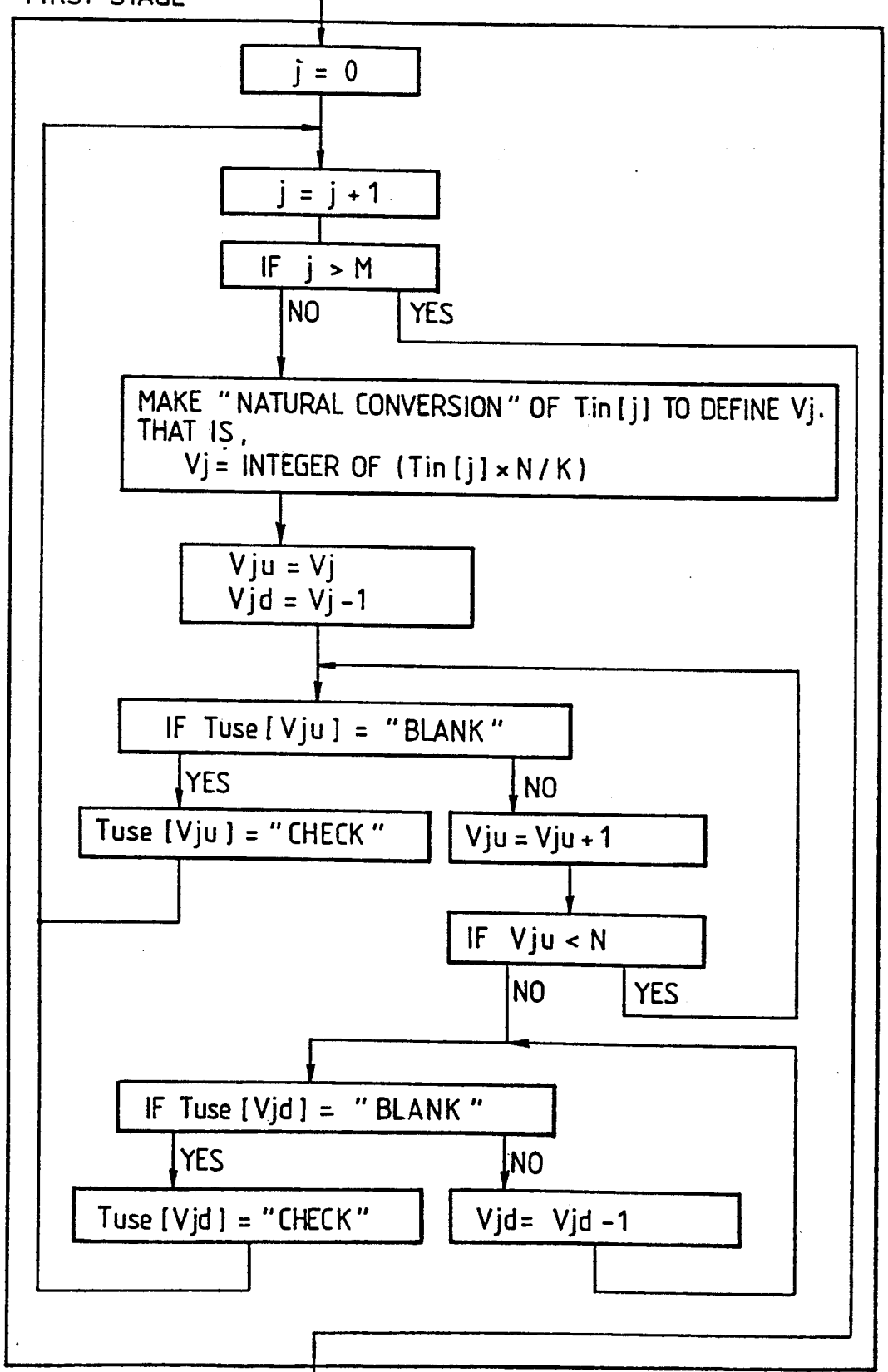
Figure 4C:
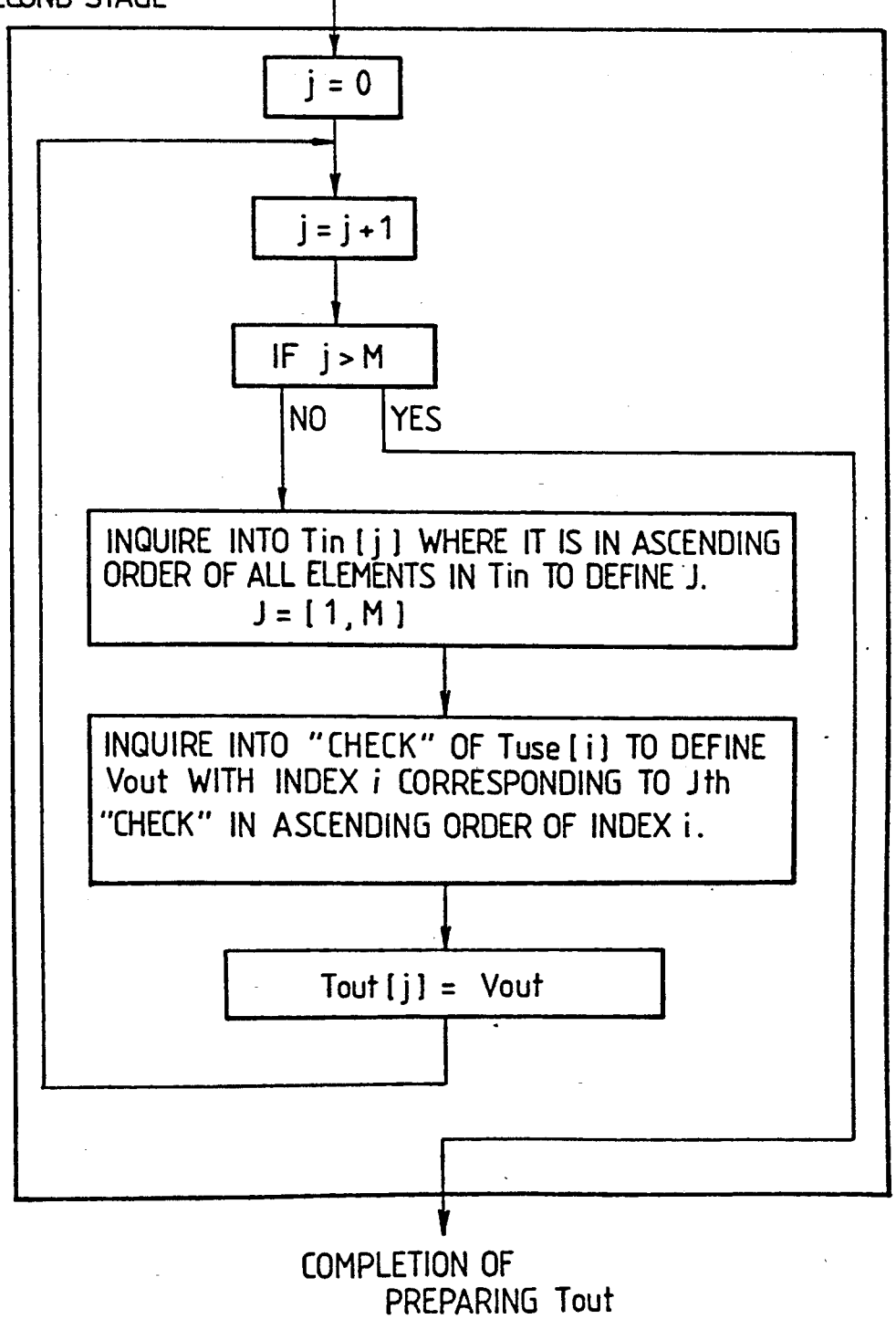

The algorithm for making such a conversion table will now be described with reference to the processing tables shown in FIGS. 3a–3e and the flow charts shown in FIGS. 4a–4c.

(a) Initialization Stage

The input representing any of the M gray levels in the K-gray scale is Vin, and the output representing the gray level in the N-gray scale corresponding to the Vin is Vout. By way of example, it will be assumed that K=64, N=16 and M=14. In this case, the Vin is an integer in the range from 0 to 63, the Vout is an integer in the range from 0 to 15, and zero means the lowest brightness or black.

Step 1: For the table Tin, M (14) gray levels among the levels in the K-gray scale are selected as the Vin, for example, 0, 1, 2, 20, 21, 22, 23, 42, 43, 46, 60, 61, 62 and 63, and are entered.

Step 2: A processing table Tuse 48, as shown in detail in FIG. 3a, is prepared and filled with blanks. The 16 individual positions in the processing table Tuse are indexed by digits from 0 to 15.

Step 3: The contents of the table Tout are made blank at first, but the contents will be filled in and completed in the second stage, as described later.

(b) First Stage

In this stage the relationship of the relative magnitudes of the brightnesses for the M gray levels to be outputted in the N-gray scale are entered in the table Tuse with a check or "o", completing the table Tuse in the manner as follows:

Step 1: Select one out of the respective elements entered in the table Tin, on which element the processes of the following steps 2–4 have not already been performed, and carry out the steps 2–4 for the selected element. When all elements in the Tin have been processed, the second stage is carried out.

Step 2: Make the "natural conversion" of Vin for the element selected in step 1, and define it as value Vj. Vju=Vj is assumed to be the initial value.

Step 3: Examine the contents of a position in the table Tuse whose index is Vju, and if it is blank, enter a check or "o" and go to Step 1. If a check has already been entered in that position, assume that Vju=Vju+1. In that case, if Vju<N, repeat Step 3. If Vju≧N, go to Step 4 with an initial value of Vjd=Vj−1.

Step 4: Examine the contents of a position in the table Tuse whose index is Vjd, and if it is blank, enter a check or "o" and go to Step 1. If a check has already been entered in that position, assume that Vjd=Vjd −1 and repeat Step 4. Because M≦N, the condition of Vjd<0 never occurs.

When the first stage is completed, checks have been entered in the table Tuse in the positions corresponding to the M indices.

(c) Second Stage

This stage is that in which the table Tout in FIG. 2 is completed by: selecting the positions in the table Tuse which have a check entered and correspond to the respective elements in the table Tin, and entering the indices corresponding to the positions into the table Tout. This is carried out in the manner as follows:

Step 1: Select from the table Tin an element on which the processes of the second stage have not been performed, and execute the following Steps 2–4. The second stage will be completed with the completion of the processes of the following Steps 2–4 on all the elements in the table Tin.

Step 2: Determine where the value Vin of the element selected in Step 1 is in ascending order of all the elements of the table Tin, and define it as value J. J takes a value in the range of [1, M].

Step 3: Assume as Vout the J-th smallest index of the indices for which the checks have been entered in the table Tuse.

Step 4: Enter the Vout obtained in the Step 3 in a position of the table Tout corresponding to the Vin, and go to Step 1.

In this second stage, the elements of the tables Tin and Tuse have been counted up from the smallest one, but, alternatively, the same result may be obtained if they are counted down from the largest one.

Further, in the above-described first stage, when the checks have been entered in the table Tuse, they are examined in the ascending order using Vju as the initial value and, at the time when N−1 is reached, then the checks are examined in the descending order using Vjd as the initial value. However, even if, to the contrary, the checks are first examined in the descending order using Vju as the initial value and are then examined in the ascending order using Vjd = Vj+1 as the initial value when zero is reached it is apparent that a similar result is obtained.

The conversion table 50 of FIG. 2 can accordingly be created as described above. Using this conversion table, a signal Vin representing one of the selected M gray levels in a K-gray scale can be converted to a signal Vout representing a gray level in an N-gray scale. This conversion is on a one-to-one basis preserving the relative order and magnitude of the respective brightnesses.

Also, it will be seen that it is easy to implement a gray scale converter practicing this invention by means of software according to the above-described algorithm, and it will be within the purview of one skilled in the art to implement this algorithm in hardware by a logic circuit.

What is claimed is:

1. A computerized method for converting first image signals, indicative of selected M gray levels in a K-gray scale, to second image signals, indicative of M identifiable levels in an N-gray scale, where K>N≧M, such that the second image signals in the N-gray scale represent the relative order and magnitude of the brightnesses of the M gray levels in the K-gray scale to accomodate the output of the second image signals on an N-gray scale image-producing device in response to the input of the first image signals, comprising the steps of:

creating a first table by mapping selected M gray levels, each represented by first image signals of x bits, in accordance with the relative order and magnitude of their brightnesses in a K-gray scale, into different M gray levels, each represented by y bits indicative of indexed positions in an N-gray scale, where K>N≧M and x>y;

wherein the step of creating said first table comprises:

providing in memory a set of positions with indexes to be used for said first table selecting said M gray levels in the K-gray scale one at a time;

performing a "natural conversion" on the x bits, by subtracting the upper y bits, of the first gray level selected for obtaining its gray scale value Vj in the N-gray scale;

entering a check in the position in said first table of an index Vju, using Vju=Vj as the initial value in said first table, if no check has been entered in said position;

if a check has been entered in said position, letting Vju=Vju+1, and if said latter index Vju<N, entering a check in the position of said latter index Vju, and if said latter index Vju≧N, entering a check in the position of an index Vjd, using Vjd=Vj−1 as the initial value, if no check has been entered in said Vjd position; and if a check has been entered in said Vjd position, letting Vjd = Vjd−1, and entering a check in the position of said latter index Vjd; and performing a "natural conversion" on the x bits of each of the other M gray levels as selected, for obtaining their gray scale values in the N-gray scale and entering checks in the positions in said first table according to the indexes as determined by the above-recited steps;

creating a second table by mapping said different M gray levels, in the N-gray scale mapped in said first table, correspondingly to the M gray levels in said K-gray scale and storing said second table in memory;

inputting first image signals to said stored second table;

using said second table to convert an input x bit first image signal indicative of an M gray level in said K-gray scale to an output y bit second image signal indicative of the corresponding M gray level in said N-gray scale; and supplying second image signals output by said second table for output on an N-gray scale image-producing device in response to the input of first image signals indicative of gray levels in a K-gray scale.

2. A method as in claim 1 wherein the step of creating said second table comprises:

selecting said M gray levels in the K-gray scale one at a time;

determining where the value Vin of the selected gray level is in the ascending order of M gray level values in the K-gray scale, and determining its ranking J;

designating the J-th smallest index of the indices of the positions with checks entered in said first table, as Vout; and entering said Vout into a position in said second table corresponding to said Vin value.

3. A method as in claim 2 wherein the step of using said second table comprises:

comparing the value of a first input signal with the Vin values in said second table and converting a matching x bit Vin signal, representing the M gray level in the K-gray scale, to the matching y bit Vout signal in said second table, representing the M gray level in the N-gray scale.

4. A method as in claim 3 further comprising the step of:

supplying said x bit Vin signals, representing said M gray levels in the K-gray scale, to an image-producing device capable of displaying K-gray scale images while supplying said Vout signals to an image-producing device capable of displaying N-gray scale images.

5. A computerized system for converting first image signals, indicative of selected M gray levels in a K-gray scale, to second image signals, indicative of M identifiable levels in an N-gray scale, where K>N≧M, such that the second image signals in the N-gray scale represent the relative order and magnitude of the brightnesses of the M gray levels in the K-gray scale to accomodate the output of the second image signals on an N-gray scale image-producing device in response to the input of the first image signals, comprising:

means for creating a first table by mapping selected M gray levels, each represented by a first image signal of x bits, in accordance with the relative order and magnitude of their brightnesses in a K-gray scale, into different M gray levels, each represented by y bits indicative of indexed positions in an N-gray scale, where K>N≧M and x>y;

wherein the means for creating said first table comprises:

memory means, having a set of positions with indexes, for receiving values to be entered in said first table means for selecting said M gray levels in the K-gray scale one at a time;

means for performing a "natural conversion" on the x bits, by subtracting the upper y bits, of the first gray level selected for obtaining its gray scale value Vj in the N-gray scale;

means for entering a check in the position in said first table of an index Vju, using Vju=Vj as the initial value in said first table, if no check has been entered in said position;

means, if a check has been entered in said position, for letting Vju=Vju+1, and if said latter index Vju<N, for entering a check in the position of said latter index Vju; and means, if said latter index Vju≧N, for entering a check in the position of an index Vjd, using Vjd=Vj−1 as the initial value, if no check has been entered in said Vjd position; and means, if a check has been entered in said Vjd position, for letting Vjd=Vjd−1 and entering a check in the position of said latter index Vjd; and means for actuating said foregoing means to perform a "natural conversion" on the x bits of each of the other M gray levels as selected, for obtaining their gray scale values in the N-gray scale, and, to enter checks in the positions in said first table according to the indexes as determined by the foregoing means in said first table creating means;

means for creating a second table by mapping said different M gray levels, in the N-gray scale mapped in said first table, correspondingly to the M gray levels in said K-gray scale and storing said second table in memory;

means for inputting first image signals to said stored second table;

means for using said second table to convert an input x bit first image signal indicative of an M gray level in said K-gray scale to an output y bit second image signal indicative of the corresponding M gray level in said N-gray scale; and means for supplying second image signals output by said second table for output on an N-gray scale image-producing device in response to the input of first image signals indicative of gray levels in said K-gray scale.

6. A system as in claim 5 wherein the means for creating said second table comprises:

means for selecting said M gray levels in the K-gray scale one at a time;

means for determining where the value Vin of the selected gray level is in the ascending order of M gray level values in the K-gray scale, and determining its ranking J;

means for designating the J-th smallest index of the indices of the positions with checks entered in said first table, as Vout; and means for entering said Vout into a position in said second table corresponding to said Vin value.

7. A system as in claim 6 wherein said means for using said second table comprises:

means for comparing the value of a first input signal with the Vin values in said second table and converting a matching x bit Vin signal, representing the M gray level in the K-gray scale, to the matching y bit Vout signal in said second table, representing the M gray level in the N-gray scale.

8. A system as in claim 7 further comprising means for supplying said x bit Vin signals, representing said M gray levels in the K-gray scale, to an image producing device capable of displaying K-gray scale images while supplying said y bit Vout signals to an image producing device capable of displaying N-gray scale images.

* * * * *